(12) United States Patent
Menting et al.

(10) Patent No.: US 6,984,450 B2
(45) Date of Patent: Jan. 10, 2006

(54) MICROENCAPSULATED RUBBER ADDITIVE

(75) Inventors: Karl-Hans Menting, Buccholz (DE); Christopher Stone, Hamburg (DE)

(73) Assignee: Schill & Seilacher (GmbH & Co.), Hamburg (DE)

( * ) Notice: Subject to any disclaimer, the term of this patent is extended or adjusted under 35 U.S.C. 154(b) by 0 days.

(21) Appl. No.: 09/555,151

(22) PCT Filed: Nov. 18, 1998

(86) PCT No.: PCT/EP98/07362

§ 371 (c)(1),
(2), (4) Date: May 24, 2000

(87) PCT Pub. No.: WO99/27012

PCT Pub. Date: Jun. 3, 1999

(65) Prior Publication Data

US 2003/0165682 A1 Sep. 4, 2003

(30) Foreign Application Priority Data

Nov. 25, 1997 (DE) ......................... 197 54 341

(51) Int. Cl.
*B32B 25/00* (2006.01)

(52) U.S. Cl. .......................... 428/402.21; 428/402.22; 428/403; 428/407; 525/56; 525/61

(58) Field of Classification Search ............ 428/402.21, 428/402.22, 403, 407; 525/56, 61
See application file for complete search history.

(56) References Cited

FOREIGN PATENT DOCUMENTS

| DE | 40 13 005 | 10/1991 |
|---|---|---|
| FR | 2 603 273 | 3/1988 |
| JP | A 52 69454 | 6/1977 |
| JP | 52-069454 | 6/1977 |
| JP | 52069454 | 6/1977 |
| JP | 61-129039 | 6/1986 |

OTHER PUBLICATIONS

Derwent, Jun. 1977, AN 51363Y/29 (JP 52069454 A), pp. 346, JP 52069454.
Chemical Abstracts, Jun. 1977, vol. 87: 153222v, p. 50.
Enzyclopedia of Polymer Science and Technology, "Microencapsulation", vol. 8, New York, John Wiley & Sons, Inc., 1968, pp. 719–736.

*Primary Examiner*—Samuel A. Acquah
(74) *Attorney, Agent, or Firm*—Collard & Roe, P.C.

(57) ABSTRACT

The invention relates to a rubber additive composition which contains at least one rubber additive (a), the at least one additive (a) being encased in coating material (b) accompanied by formation of microcapsules. The additive can in particular be sulphur or another vulcanization agent, a vulcanization accelerator and/or activator.

14 Claims, No Drawings too difficult to disperse it uniformly in the rubber mixture. Furthermore, is it unstable when stored as such or in the rubber mixture and can easily change into the soluble crystalline form.

MICROENCAPSULATED RUBBER ADDITIVE

BACKGROUND OF THE INVENTION

1. Field of the Invention

The invention relates to a composition containing at least one microencapsulated rubber additive, to a process for its preparation, to its use in the preparation of rubber and rubber mixtures and to rubber mixtures and rubber products manufactured with it.

2. The Prior Art

Rubber additives are for example vulcanization chemicals such as vulcanization agents, vulcanization accelerators and retardants as well as acceleration activators.

In the preparation of most rubber mixtures, for example relative to the additive sulphur, organic compounds which contain sulphur in thermally labile form, or elemental sulphur, are used in order to crosslink the polymer molecules during a high-temperature vulcanization stage (normally roughly 150 to 190° C.). The sulphur is mixed into the rubber mixture during a mixing process in which the temperature normally does not exceed 110° C.

Sulphur exists in various allotropic forms. The sulphur modifications most frequently used in the rubber industry are crystalline (rhombic or monoclinic sulphur) and melt at 124 and 129° C. respectively. Crystalline sulphur is favourably priced. It is completely soluble in the rubber at mixing temperatures of ca. 100° C., but displays only limited solubility at room temperature. The solubility at room temperature depends on the type of rubber polymer and to a certain extent on the other mixture constituents present, but is generally of the order of 1 wt.-%, relative to the polymer.

Sulphur is normally added to rubber mixtures in concentrations of roughly 0.4 to 5 wt.-%, more preferably 1.0 to 4 wt.-% and frequently in the range 1.5 to 3 wt.-%, relative to the rubber polymer. One type of rubber mixture that is very important in the tyre industry is that which is used for the coating of steel cord-reinforced tyres. This mixture generally contains 4 to 5 wt.-% sulphur.

Because of the limited solubility, described above, of sulphur, any sulphur which was dissolved in excess of the quantity soluble at room temperature in the ca. 100 to 110° C. hot rubber mixture is separated from the mixture when the latter cools after mixing or after processing steps such as extruding or calendering. When this change takes place, the sulphur that has become insoluble in the rubber precipitates out and blooms at the surface of the rubber, i.e. it migrates to the surface of the rubber. A crystalline layer then forms there which destroys the natural tackiness and adhesivity of the rubber, as a result of which it becomes practically impossible to stick such rubber to other rubber components of a complex article, such as for example a tyre.

It is the state of the art to solve this problem through the use of other allotropic forms of sulphur, namely of amorphous, insoluble sulphur. This type of sulphur is completely insoluble in rubber at all temperatures below roughly 105° C. and thus behaves like an inert filler. The sulphur particles which are dispersed in the rubber mixture during mixing remain where they are when the temperature of the mixture falls after the mixing or processing, so that the surface tackiness/adhesivity of the mixture is not disadvantageously affected.

Amorphous, insoluble sulphur does however have a series of important disadvantages. Thus it is very expensive, and it is very difficult to disperse it uniformly in the rubber mixture. Furthermore, is it unstable when stored as such or in the rubber mixture and can easily change into the soluble crystalline form.

Limited storability is a problem which is also known from other rubber additives used during vulcanization. For example, vulcanization chemicals such as sulphur silanes are very sensitive to moisture. The same applies to vulcanization accelerators such as benzothiazyl-2-cyclohexylsulphenamide (CBS), which can be stored for some months at most.

In an attempt to overcome the cited disadvantages, amorphous, insoluble sulphur is frequently used in the form of a mixture with oils or other dispersion auxiliaries, but the level of insoluble sulphur can then be as low as 60 wt.-%. This further increases the cost of using the amorphous, insoluble sulphur.

The instability of amorphous, insoluble sulphur increases at high temperatures and in the presence of amines or compounds with amine groups. Thus, temperatures above 100° C. induce the start of the transformation into crystalline sulphur. A further rise in temperature accelerates the transformation. The preparation and processing of the rubber mixture must therefore be precisely controlled in order to minimize this transformation.

Most organic accelerators which are used in rubber mixtures display amino groups which already catalyse the transformation of amorphous, insoluble sulphur into crystalline, soluble sulphur at room temperature. Many anti-ageing/anti-degradation agents used in rubber mixtures have amino groups or are amines which likewise catalyse the transformation of amorphous, insoluble sulphur. This transformation can even take place in the raw material store if amorphous, insoluble sulphur is stored in the vicinity of such chemicals. However, it can also take place in the mixture.

Corresponding problems regarding the stability and the behaviour in rubbers, also vis-à-vis co-additives, and during processing also exist with many other rubber additives such as e.g. vulcanization accelerators and retardants as well as acceleration activators.

SUMMARY OF THE INVENTION

The object of the present invention is thus to make rubber additives available in the form of a composition which is suitable for use in rubber or rubber mixtures. The additives, in particular vulcanization chemicals, are to be easily workable into the rubber and well compatible with the rubber material, display a high effectiveness in the rubber or in the rubber mixture and be characterized by good distributability in the rubber material. The compositions are also to be characterized by stability during storage in the vicinity of basic substances or in the rubber and by stability during the processing of the rubber at temperatures below roughly 130° C.

A further object of the invention is to provide a process for the preparation of this rubber additive composition.

Finally, the object of the present invention is to provide rubber mixtures and rubber products obtained using the additive composition.

This object is achieved by a rubber additive composition which contains at least one rubber additive (a) and is characterized in that the at least one additive (a) is encased in coating material (b) accompanied by the formation of microcapsules.

Preferred versions of the invention are the subject-matter of the dependent claims.

The rubber additives which can be used according to the invention in the form of microcapsules during rubber preparation include in particular vulcanization chemicals such as vulcanization agents, vulcanization accelerators and acceleration activators.

Suitable vulcanization agents include sulphur in its various allotropic forms, sulphur donors such as dimorphylol disulphide (DTDM), 2-morpholinodithiobenzothiazole (MBSS), tetramethylthiuram disulphide (TMTD), caprolactam disulphide, dipentamethylenethiuram disulphide and peroxides.

Suitable vulcanization accelerators include xanthates, dithiocarbamates, tetramethylthiuram disulphide and other thiurams, thiazoles, sulphenamides, in particular benzothiazyl-2-cyclohexyl sulphenamide (CBS), benzothiazoyl-2-tert.-butyl sulphenamide (TBBS), guanidines, thiourea derivatives and amine derivatives.

Other suitable vulcanization accelerators are 2-mercaptobenzothiazole (MBT), zinc salt of 2-mercaptobenzothiazole (ZMBT), benzothiazyl-2-sulphene morpholide (MBS), benzothiazyldicyclohexyl sulphenamide (DCBS), diphenyl guanidine (DPG), diorthotolyl guanidine (DOTG), o-tolylbigaunide (OTBG), tetramethylthiuram monosulphide (TMTM), zinc-N-dimethyldithiocarbamate (ZDMC), zinc-N-diethyldithiocarbamate (ZDEC), zinc-N-dibutyl-dithiocarbamate (ZDBC), zinc-N-ethylphenyl-dithiocarbamate (ZEBC), zinc-N-pentamethylene dithiocarbamate (ZPMC), ethylene thiourea (ETU), diethylthiourea (DETU), diphenyl thiourea (DPTU).

The accelerators are used mostly in combination with activators such as zinc oxide, antimony sulphide and litharge and fatty acids such as stearic acid.

Other vulcanization chemicals to which the present invention can be applied are sulphur silanes such as bis (triethoxysilyl-propyl-)tetrasulphane (Si 69, trade product designation of the company Degussa).

A particularly preferred additive is crystalline sulphur, but the invention can also be applied to amorphous sulphur.

The coating materials according to the invention are characterized by good compatibility with the constituents of the rubber mixtures. Waxes, paraffins, polyethylene (PE), ethylene-vinyl acetate copolymers, polyvinyl alcohols (PVA) and mixtures of same are used in particular as coating material, with polyvinyl alcohols such as Mowiol 8-88 (trade product of the company Clariant, D-65926 Frankfurt), a PVA on the basis of polyvinyl acetate with a residual acetyl content, and polyethylene waxes such as Vestowax A 616 (trade product of the company Hüls AG, Marl) being particularly suitable.

The following coating materials are also suitable for the preparation of the microcapsules according to the invention: calcium caseinate, calcium polypectate, polyacrylic acid and derivatives, polycarbonates, polyethylene oxide, polymethacrylate ester, polyorthoester, polyvinyl acetate, polyvinylpyrrolidone and thermoplastic polymers.

Polymerizable liquid polyacrylate compositions which can contain a catalyst system consisting of photoinitiator and thermal initiator, polymerizable mixtures of dihydropyridine, tetrazole and a soluble ionic salt, polyurethanes, amorphous polyesters which optionally contain tertiary amine groups, mixtures of polyamino compositions and derivatives of 2,4,6-triamino-1,3,5-triazine with aldehydes, mixtures of polyethylene and polyvinyl alcohols, aminoplastic resins from reactions of triaminotriazine with aldehydes and optionally polyamino compounds, aminoaldehyde resins, organic silicone polymers, polyvinylpolyolefin copolymers, interface-polymerized polymers with functional methylene groups, anionic polymeric surfactants such as those from (meth)acrylic acid or (meth) acrylonitrile and acrylamide sulphonic acid and/or sulphoalkyl acrylate and styrene resins are also suitable coating materials.

Thermoplasts such as thermoplastic polyamide melt adhesives such as Vestamelt 170 (SP=122° C.) and Vestamelt 550 (SP=132° C.) from the company Hüls, polyamide resins such as Reamide PAS 13 (SP=115 to 120° C.) from the company Henkel, Versamid (SP=125 to 135° C.) from the company Cray Valley Products, Wolfamid 111 (SP=120 to 130° C.) from the company Viktor Wolf, polyester resins such as Dynapol L850/L860 (SP=120° C.) from the company Dynamit Nobel are also suitable as coating materials.

A common feature of the coating materials is that they generally melt in the temperature range which is important for rubber vulcanization, i.e. between roughly 100 and 260° C. They preferably melt below 150° C. and preferably have a melting point in the range from 120 to 140° C., in particular of roughly 130° C. The coating materials are insoluble in rubber or in rubber mixtures prior to melting, preferably up to temperatures of 120 to 140° C., in particular up to roughly 130° C. Only at temperatures above the melting temperature, e.g. from 120 to 140° C., in particular roughly 130° C., do the coating materials become soluble in rubber.

Because of this melting or solubility behaviour of the coating materials according to the invention which encase the rubber additives according to the invention in the form of microcapsules, the behaviour of the rubber additive composition in the rubber or in rubber mixtures resembles that of the coating materials themselves. Relative to for example crystalline, soluble sulphur as additive, this has the advantage that no blooming/sulphuring up occurs at temperatures up to roughly 130° C. The casing of the microcapsules that is formed by the coating material acts as a physical barrier at all temperatures from room temperature up to 130° C. and thus gives the rubber mixture stability during storage and all processing steps below this temperature. Thus among other things the surface tackiness/surface adhesivity are retained.

The durability of the additives themselves is also increased when they are stored in the form of the composition according to the invention in micro-encapsulated form. Thus, for example, the proneness of amorphous, insoluble sulphur to be transformed into crystalline sulphur or the sensitivity of CBS to moisture is suppressed or delayed during storage in micro-encapsulated form.

In addition, the coating material makes possible a quicker and better dispersion of the particles and thus leads to a more uniform distribution in the mixture. Since the particles behave like the corresponding coating materials, disadvantageous formations of dust, such as are known for example with sulphur, are also avoided. This also leads to the advantageous effect that the risk of dust explosions, which are a major problem during sulphur processing, is clearly reduced or no longer occurs.

The microcapsules of the rubber additive composition according to the invention have on average (average by weight) a size of 1 to 75 µm, preferably 3 to 30 µm and in particular 5 to 8 µm.

The microcapsules can display the at least one additive in liquid and/or solid form.

The microcapsules display the following composition in particular:
(a) 99 to 40 wt.-%, more preferably 80 to 50 wt.-% and most preferably roughly 70 to 60 wt.-% additive and
(b) 1 to 60 wt.-%, more preferably 20 to 50 wt.-% and most preferably roughly 30 to 40 wt.-% coating material.

The microcapsules according to the invention can be prepared in different ways. An essential feature of the process is that completely encased additive in the form of microcapsules of the type and size described above is obtained.

The rubber additive compositions according to the invention are preferably prepared by allowing a mixture, which contains at least one additive, molten coating material and optionally other auxiliaries such as surfactants or dispersants, to flow in a cooling column onto a rapidly rotating device such as a rotary table and migrate to the outside because of the high centrifugal force. Because the diameter is greater at the edge, the particles are separated and the formation of agglomerates avoided. After being flung off from the edge of the rotating device, the particles fly away to the outside individually and cool in the process, as a result of which the coating solidifies. Such a process can be operated continuously and is therefore very efficient.

According to the invention, in addition to this process other processes are also considered however in which a mixture which contains at least one additive and coating material in liquid, dissolved, suspended or emulsified form is processed to give microcapsules of a composition and size as described above.

Thus, processes such as spray-drying, fluidized-bed coating, emulsion or suspension processes and precipitation also come into consideration for the preparation of the microcapsules according to the invention. For example, microcapsules can also form through cooling and settling of a mixture which contains at least one additive and coating material in a suitable solvent.

For example, sulphur as additive can be emulsified at increased temperatures and pressures, for example at roughly 130° C. and roughly 2.6 kPa (bar) in a suitable reactor and encased, accompanied by addition of anionic, cationic or non-ionic surfactants, in molten or finely emulsified coating material. Examples of anionic surfactants that come into consideration are benzene sulphonates, in particular n-$C_{10}$— to $C_{13}$—alkylbenzene sulphonates in the form of their sodium, calcium or tetraethyl ammonium salts. Also suitable according to the invention are for example naphthalene or phenolsulphonic acid condensation products. These are available as trade products Tamol® N brands or Tamol® PP from the company BASF AG. Tamol® NN 9104 has proved to be particularly suitable.

The coating material can be introduced into the reactor together with the additive. However, it can also be added only shortly before delivery. The encasing process can take place both in the reactor, by drawing off the solvents, in which case the composition according to the invention precipitates out, or by spray-drying of the mixture. If the final coating takes place only during the spray-drying, the coating material can also be added only in this process step after delivery from the reactor.

It is thus also possible with the process according to the invention to produce multi-layered capsule casinos by carrying out the coating steps several times in succession or else combining different preferred processes with one another.

The thus rubber additive compositions according to the invention can advantageously be used in the preparation of rubber or rubber mixtures, in particular those for synthetic rubber manufacture.

The advantageous behaviour of the coating material in the rubber leads, as described above, to a faster and better dispersion of the additive and thus to a more uniform distribution in the rubber mixture.

The physical barrier made from coating material also ensures that for example a sulphuring-up is avoided below roughly 130° C. if sulphur is used as microencapsulated additive. However, as well as this disadvantageous behaviour other chemical reactions of sulphur or other additives which are the contents of the microcapsules according to the invention with any other constituents of the rubber mixture are also avoided.

Thus, in particular, the problem of premature vulcanization, which is started at temperatures around roughly 110° C. by reaction of sulphur as vulcanization agent and organic vulcanization accelerator, can be avoided.

Thus it is a further advantage of the present invention that, through the incorporation of vulcanization agents in microcapsules which are resistant, i.e. impermeable, up to 130° C. in the rubber, the use of expensive retardants which serve to suppress the premature vulcanization is avoided. In particular a simplification in the control of the process for the production of synthetic rubber articles such as tyres etc. can also result in this way. The release of the encapsulated additive takes place only when the coating material melts and dissolves in the rubber.

The subject of the present invention is also rubbers, rubber mixtures or rubber products prepared using the additive compositions according to the invention.

DETAILED DESCRIPTION OF PREFERRED EMBODIMENTS

The invention is illustrated in the following with reference to embodiments.

EXAMPLE 1

Microencapsulation of 2-mercapto-benzothiazole (MBT) in the Rotary-Table Process MBT powder customary in the trade was first ground to an average particle size of 5 μm in an impact mill. The obtained fine powder was melted together in the weight ratio 7:3 with polyethylene wax having a molar mass of roughly 1600 g/mol (Vestowax A 616, trade product of the company Hüls AG) having a melting point of roughly 125° C. and passed at 135° C. onto a rotary table which atomized the material in a cooling tower. Apart from the desired microcapsules of roughly 5 μm diameter, finer particles of polyethylene wax were also obtained which were separated via a cyclone and returned to the process.

EXAMPLE 2

Microencapsulation of Dibenzothiazyldisulphide (MBTS) in the Suspension Process 1.0 kg MBTS powder customary in the trade from the company Flexsys, Brussels having an average particle size of 5.3 μm were heated accompanied by stirring to 70° C. with addition of 0.05 kg of an alkylbenzene sulphonate as surfactant (Marion A 365, anionic surfactant of the company Hüls AG) and 2.0 kg water in V4A stirrer with anchor stirrer and added to 1.0 kg of a solution heated to 70° C. of 0.28 kg polyethylene wax having a molar mass of roughly 1600 g/mol (Vestowax A 616, low-molecular-weight low-pressure polyethylene of the company Hüls AG, melting point 125° C.) in cyclohexane. n-heptane can also be used as an alternative to cyclohexane.

The obtained dispersion was cooled to 20° C. accompanied by intensive stirring, the microcapsules according to the invention forming around the individual accelerator crystals. The isolation of the end-product took place through spray-drying in a conventional fluidized-bed dryer, such as is supplied for example by the company Glatt AG, D-79859 Binzen. 1.24 kg of microencapsulated accelerator were obtained, which corresponds to a yield of 93%. The accelerator content was 75.1 wt.-%.

EXAMPLE 3

Accelerators and vulcanization agents which are not prepared by precipitation processes in aqueous suspension can advantageously be converted into microcapsules by the following process.

The particles ground to an average grain size of 5 μm by suitable grinding, e.g. in impact mills, optionally under protective gas such as nitrogen, were suspended in a saturated solution of PE wax with a melting point of 125° C. in n-heptane and, after thorough mixing, subjected to a spray-drying, the microcapsules according to the invention forming in the process. This method is suitable for all accelerators and vulcanization agents which, because of their polar chemical structure, dissolve only minimally or not at all in n-heptane. Cyclohexane can also be advantageously used.

EXAMPLE 4

Microencapsulation of Sulphur in the Emulsion Process with Polyvinyl Alcohol 3.00 kg of ground sulphur customary in the trade were introduced into a 10-1 pressure reactor made from V4A steel with 6.55 kg tap water, 0.15 kg of an alkylbenzene sulphonate (Marlon A 365, anionic surfactant from the company Hüls AG), 0.15 kg of a naphthalene sulphonic acid condensation product (Tamol® NN 9104, rubber-compatible surfactant or dispersion auxiliary from the company BASF AG) and 0.30 kg polyvinyl alcohol (Mowiol 8-88, trade product from the company Clariant, D-65926 Frankfurt) and homogenized by stirring with the incorporated anchor stirrer. The reactor was heated with steam to a temperature of 128° C. It was observed through the fitted inspection glass that the sulphur had melted after roughly 30 minutes at a steam pressure measured in the boiler of 2.6 bar. After a further 10 minutes' stirring and pumping round via a rotor-stator mixer (Dispax) the resultant emulsion was atomized via a heated line in a fluidized-bed spray-dryer which was operated in the circulating-air system with nitrogen heated to 70° C. After roughly 50 minutes the spraying process was ended. Because of the evaporation of the water, the temperature in the spent air fell to 58 to 60° C. The obtained product was a fine yellow-brown powder. The yield was 2.37 kg, which is equivalent to 66%. The sulphur content of the product was 81 wt.-%.

EXAMPLE 5

Microencapsulation of Sulphur in the Emulsion Process with Polyethylene Wax 3.00 kg ground sulphur customary in the trade were introduced into a 10-1 pressure reactor made from V4A steel with 6.55 kg tap water, 0.15 kg of an alkylbenzene sulphonate (Marlon A 365, anionic surfactant from the company Hüls AG), 0.15 kg of a naphthalene sulphonic acid condensation product (Tamol® NN 9104, rubber-compatible surfactant or dispersion auxiliary from the company BASF AG) and 0.30 kg of a polyethylene wax with a molar mass of roughly 1600 g/mol (Vestowax A 616, low-molecular-weight low-pressure polyethylene from the company Hüls AG) with a melting point of roughly 125° C. and homogenized by stirring with the incorporated anchor stirrer. The reactor was heated with steam to a temperature of 128° C. It was observed through the fitted inspection glass that the sulphur had melted after roughly 30 minutes at a steam pressure measured in the boiler of 2.6 bar. After a further 10 minutes' stirring and pumping round via a rotor-stator mixer (Dispax) the resultant emulsion was atomized via a heated line in a fluidized-bed spray-dryer which was operated in the circulating-air system with nitrogen heated to 70° C. After roughly 50 minutes the spraying process was ended. Because of the evaporation of the water, the temperature in the spent air fell to 58 to 60° C. The obtained product was a fine yellow-brown powder. The yield was 2.27 kg, which is equivalent to 63%. The sulphur content of the product was 82 wt.-%.

EXAMPLE 6

Making-Up of the Microencapsulated Additives

The microcapsules prepared according to any one of the previous examples were converted in a further step of the method in a fluidized-bed reactor (2.27 kg microencapsulated additive) by spraying 0.227 kg of a low-melting, wax-like substance such as pentaerythritoltetra-stearate or mineral oil, the initially obtained powder was converted from microcapsules into beads 0.1 to 10 mm in size. These practically no longer contained any dust, were free-flowing and were thus able to be weighed automatically.

Because of the low melting point of the waxy substance which holds the beads together, the microcapsules were released again in their original form during the following incorporation into rubber mixtures.

What is claimed is:
1. Rubber additive composition comprising
    at least one rubber additive (a), which is encased in coating material (b) accompanied by formation of microcapsules,
    said coating material (b) is insoluble in rubber or in rubber mixtures below temperatures of 120° C. to 140° C. and is selected from the group consisting of waxes, paraffins, polyethylene, ethylene-vinyl acetate copolymers, polyvinyl alcohols and mixtures thereof; and
    said microcapsules have a size range of 1 to 75 μm;
    wherein the additive (a) is crystalline soluble sulfur; and
    wherein the coating material (b) is soluble or melts at temperatures above 120° C. in rubber or in rubber mixtures.
2. Composition according to claim 1,
    wherein the coating material (b) is insoluble in rubber or in rubber mixtures up to temperatures above 120° to about 130° C.
3. Composition according to claim 1,
    wherein the microcapsules have a size range of 3 to 30 μm.
4. Composition according to claim 1,
    wherein the coating material (b) is soluble or melts at temperatures above 130° C., in rubber or in rubber mixtures.
5. Composition according to claim 1,
    wherein the microcapsules have a size range of from 5 to 8μm.

6. Composition according to claim 1,
wherein it contains
a) 99 to 40 wt.-% of additive and
b) 1 to 60 wt.-% of coating material.

7. Composition according to claim 1,
wherein it contains
a) 80 to 50 wt.-% of additive and
b) 20 to 50 wt.-% of coating material.

8. Composition according to claim 1,
wherein it contains
a) 70 to 60 wt.-% of additive and
b) 30 to 40 wt.-% of coating material.

9. Process for the preparation of a rubber additive composition which contains at least one rubber additive (a), which is encased in coating material (b) accompanied by formation of microcapsules, said coating material (b) is insoluble in rubber or in rubber mixtures below temperatures of 120° C. to 140° C. and is selected from the group consisting of waxes, paraffins, polyethylene, ethylene-vinyl acetate copolymers, polyvinyl alcohols and mixtures thereof, said microcapsules have a size range of 1 to 75 μm
comprising the steps of:
preparing a mixture of said at least one rubber additive (a) and coating material (b) dissolved, suspended or emulsified in liquid form;
wherein the additive (a) is crystalline soluble sulfur; and
wherein the coating material (b) is soluble or melts at temperatures above 120° C. to 140° C. in rubber or in rubber mixtures; and
solidifying said mixture liquid to form said microcapsules in the size range of 1 to 75 μm.

10. Process according to claim 9, comprising
feeding the mixture liquid onto a rotating device; and
solidifying the mixture during movement of the liquid towards an outside of the rotating device so as to form said microcapsules.

11. Process according to claim 9, comprising
forming the mixture into microcapsules in a fluidized bed.

12. Process according to claim 9, comprising
forming an emulsion or suspension of the mixture and spray-drying the liquid to form the microcapsules.

13. Process according to claim 9, comprising
forming an emulsion or suspension of the mixture and forming the microcapsules by precipitation from the liquid.

14. Process according to claim 9, comprising
forming an emulsion or suspension of the mixture and cooling the liquid causing the microcapsules to settle out of the liquid.

* * * * *